United States Patent
Ueda

(10) Patent No.: US 6,815,663 B2
(45) Date of Patent: Nov. 9, 2004

(54) APPARATUS FOR OPTICAL SCANNING ALONG WITH MEASUREMENT OF OPTICAL CHARACTERISTICS WITHIN SCANNING REGION

(75) Inventor: Takeshi Ueda, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 66 days.

(21) Appl. No.: 10/160,153

(22) Filed: Jun. 4, 2002

(65) Prior Publication Data

US 2002/0195552 A1 Dec. 26, 2002

(30) Foreign Application Priority Data

Jun. 25, 2001 (JP) .......................... 2001-191066

(51) Int. Cl.[7] .................................................. H01J 3/14
(52) U.S. Cl. .................... 250/234; 250/236; 347/235
(58) Field of Search .............................. 250/234–236; 347/116, 233–236, 246–261; 359/216

(56) References Cited

U.S. PATENT DOCUMENTS 5,451,778 A * 9/1995 Hubble et al. .............. 250/234
6,268,876 B1 * 7/2001 Ozaki et al. ................ 347/225
6,400,391 B1   6/2002 Suhara et al.
2001/0035493 A1  11/2001 Nobuaki
2002/0001118 A1   1/2002 Tomohiro
2002/0039132 A1   4/2002 Hayashi et al.
2002/0060829 A1   5/2002 Ueda
2002/0100869 A1   8/2002 Hayashi

FOREIGN PATENT DOCUMENTS

JP          06-320786      11/1994

* cited by examiner

Primary Examiner—Thanh X. Luu
(74) Attorney, Agent, or Firm—Dickstein Shapiro Morin & Oshinsky LLP

(57) ABSTRACT

A scanning type optical device comprises one optical characteristics measuring unit per color. Each optical characteristics measuring unit further includes three units. The first unit is provided on a writing start side within a scanning region, the second unit is provided on the other end side within the scanning region, and the third unit is arranged substantially at the center in the scanning region. Laser beams emitted from each of four semiconductor lasers are modulated based on signals detected by the three units in such a manner that a difference between a real image height and an ideal image height is reduced over the entire scanning region.

13 Claims, 3 Drawing Sheets

APPARATUS FOR OPTICAL SCANNING ALONG WITH MEASUREMENT OF OPTICAL CHARACTERISTICS WITHIN SCANNING REGION

FIELD OF THE INVENTION

The present invention relates to a scanning type optical device of the tandem type, and an image formation apparatus provided with the scanning type optical device of the present invention.

BACKGROUND OF THE INVENTION

Examples of image formation apparatuses include a digital color image formation apparatus such as a digital color copying machine, in which a writing operation is performed with respect to each of rotary photosensitive members with scanning beams corresponding to images of a plurality of different colors by scanning type optical devices independently disposed in a manner corresponding to the photosensitive members, respectively, and having a plurality of writing unit, so as to form electrostatic latent images, which are then developed with a toner of a corresponding color by a plurality of developing units, respectively, and thereafter, the developed toner images are superimposed on and transferred onto a recording medium (i.e., a transfer member), thus forming a color image.

The writing unit for use in the above-described digital color image formation apparatus emits a writing beam (i.e., an optical flux) from a light source such as a semiconductor laser, the beam is used as a scanning beam via an optical part consisting of a writing lens or the like, and then, the photosensitive member serving as a member to be scanned is scanned with the scanning beam, thus forming an electrostatic latent image in accordance with image information on the photosensitive member.

In the lens serving as the optical part disposed in the above-described writing unit, a beam spot diameter may be varied at each position in a main scanning direction of the beam or optical characteristics such as a light intensity may be varied caused by non-uniformity inside the lens, variations in part precision in forming the shape of a surface or variations in shape influenced by temperature variations.

The above-described variations such as optical characteristics at the positions in the main scanning direction or the like are critical even in a monochromatic image formation apparatus since they cause distortion or non-uniformity of an image. In particular, they have been significantly critical in a color image formation apparatus since they cause a difference in hue (tint) to markedly reduce the quality of a color image.

In view of this, in order to keep the high quality of the color image, the optical characteristics of the scanning beam are measured at a plurality of positions in the main scanning direction, it has been necessary to correct the optical characteristics based on the measurement result in such a manner as to prevent great variations in optical characteristics at the positions in the main scanning direction.

In the conventional image formation apparatus having the scanning type optical device which performs a writing operation by using a beam as disclosed in Japanese Patent Application Laid-open No. H6-320786, a first laser beam detecting sensor is disposed at one end in a scanning region which is out of an image region of a laser beam, and further, a second laser beam detecting sensor is disposed at the other end in the scanning region, and thus, a corrected writing frequency is calculated based on a time after the first laser beam detecting sensor detects the laser beam till the second laser beam detecting sensor detects the laser beam or a count by a clock, so as to correct a writing clock frequency.

However, since the image formation apparatus disclosed in Japanese Patent Application Laid-open No. H6-320786 is configured such that the writing clock frequency is corrected by using the first laser beam detecting sensor disposed at one end in the scanning region and the second laser beam detecting sensor disposed at the other end in the scanning region, there has arisen a problem that the frequency cannot be corrected at an intermediate portion between the first laser beam detecting sensor and the second laser beam detecting sensor although a difference in height between a real image and an ideal image around both of the ends in the scanning region can be made zero.

Therefore, the difference in height between the real image and the ideal image at the intermediate portion becomes large, thereby arising a problem that the quality of a color image tends to derogate caused by color drifting in the instance of a color image or a hue (or a tint) different from an actual one.

The above-described problems should be solved by, for example, disposing a laser beam detecting sensor also at the intermediate portion between the first laser beam detecting sensor and the second laser beam detecting sensor, so as to correct to reduce the difference in height between the real image and the ideal image based on a signal detected by the laser beam detecting sensor disposed at the intermediate portion. However, then the laser beam detecting sensor disposed at the intermediate portion is located within the scanning region of the laser beam. Consequently, in this instance, the laser beam detecting sensor shuts out the scanning beam (i.e., an optical flux) directing toward a photosensitive drum, thereby making it impossible to write a desired image on the photosensitive drum.

In view of this, in the conventional image formation apparatus, the difference in height between the real image and the ideal image substantially at the center in the scanning region is detected only at the time of fabrication and correction is performed so as to reduce the difference.

However, this method has arisen a problem that it cannot cope with variations in optical characteristics caused by the deformation of an optical lens in the scanning type optical device according to variations in temperature in the environment in which the image formation apparatus is placed, or secular changes in optical characteristics caused by a long-term use.

Moreover, the image formation apparatus disclosed in Japanese Patent Application Laid-open No. H6-320786 is configured such that the writing frequency is corrected based on the difference in time when the two laser beam detecting sensors detect the laser beams, so that although the correction can be performed when a scanning speed of the laser beam is constant and is deviated from an ideal speed, the correction cannot be performed very accurately when the scanning speed is varied at each position.

SUMMARY OF THE INVENTION

It is an object of the present invention to provide a technology which makes it possible to prevent any generation of a portion at which the difference in height between the real image and the ideal image over the entire scanning region is extremely large, and further, make it difficult to generate color drifting on the image even when the color image is formed and making the hue (tint) excellent.

The scanning type optical device according to one aspect of the present invention is of a tandem type and makes it possible to print in an overlapping manner each of images formed by scanning with the plurality of scanning beams on a single piece of recording medium. This scanning type optical device comprises a deflector which deflects, with a rotating member, an optical flux emitted from a light source to obtain a plurality of optical fluxes; a plurality of scanning type optical systems each including an image focusing optical system, wherein each of the scanning type optical systems obtains a scanning beam by making each of the optical fluxes deflected by the deflector pass through the image focusing optical system; a plurality of optical characteristics measuring units each of which measures optical characteristics of the respective scanning beam.

Each of the optical characteristics measuring units includes a first optical characteristics measuring unit which detects the optical fluxes directed toward a predetermined position around one end within a scanning region of the scanning beam;

a second optical characteristics measuring unit which detects the optical fluxes directed toward a predetermined position around the other end within the scanning region of the scanning beam; and at least one third optical characteristics measuring unit interposed between the first optical characteristics measuring unit and the second optical characteristics measuring unit.

The scanning type optical device further comprises a modulating unit which modulates the optical fluxes emitted from the light sources based on signals detected by the first, second and third optical charateristics measuring units.

The image formation apparatus according to another aspect of the present invention comprises the scanning type optical device according to the present invention.

Other objects and features of this invention will become apparent from the following description with reference to the accompanying drawings.

DETAILED DESCRIPTIONS

Embodiments of the scanning type optical device and the image formation apparatus present invention will be described hereinafter in reference to the accompanying drawings.

Figure 1:
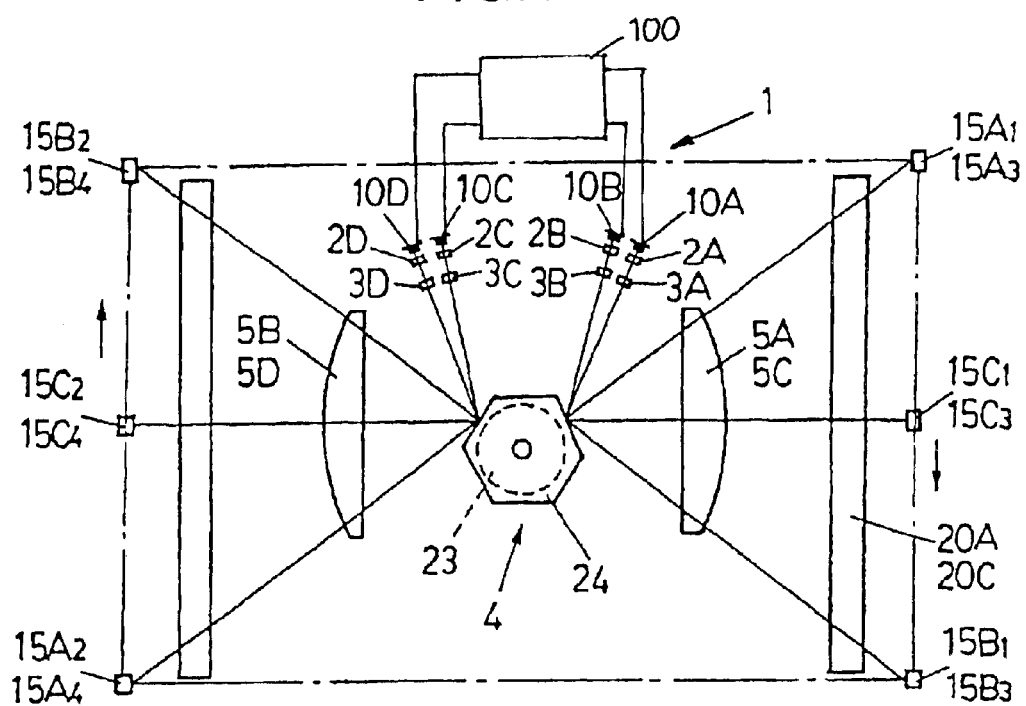
FIG. 1 is a view which shows optical systems in a scanning type optical device exploded on the same plane in a first embodiment according to the present invention.
Figure 2:
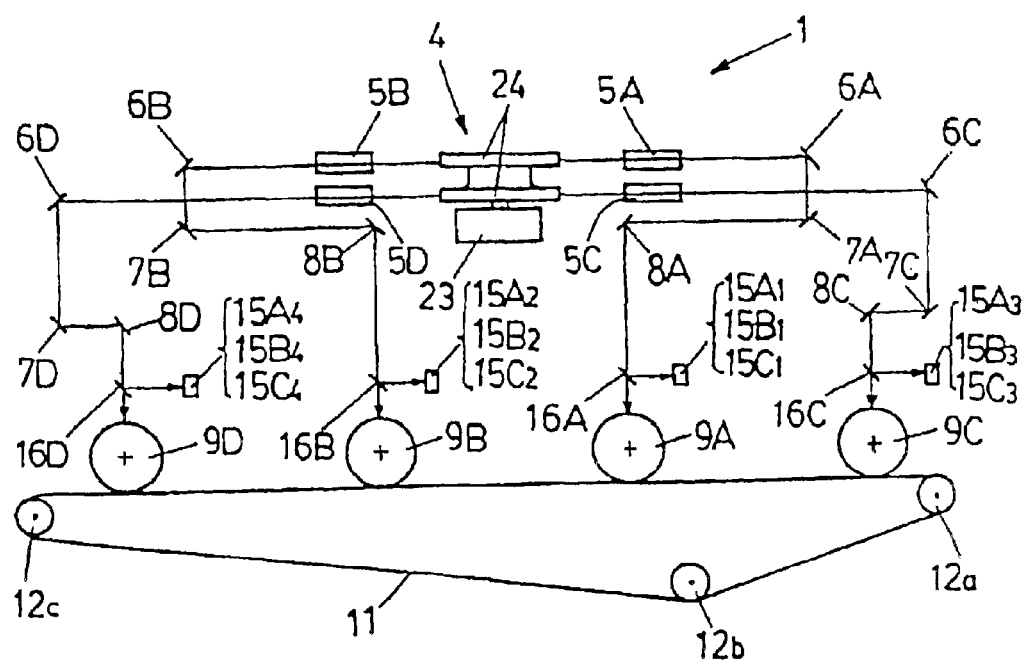
FIG. 2 is a view which shows the configuration of an image formation unit in an image formation apparatus provided with the scanning type optical device.

FIG. 1 is a view which shows optical systems in a scanning type optical device exploded on the same plane in a first embodiment according to the present invention. FIG. 2 is a view which shows the configuration of an image formation unit in an image formation apparatus provided with the scanning type optical device.

A scanning type optical device 1 shown in FIG. 1 is of the tandem type. This scanning type optical device 1 comprises a deflector 4 including a polygon motor 23 and polygon mirrors (rotary members) 24, which deflects optical fluxes of laser emitted from semiconductor lasers 10A, 10B, 10C and 10D serving as light sources, respectively; scanning lenses 5A, 5B, 5C and 5D serving as scanning type optical systems for using the plurality of optical fluxes deflected by the deflector 4 as scanning beams via image focusing optical systems, respectively; a plurality of optical characteristics measuring devices $15A_1$ to $15A_4$, $15B_1$, to $15B_4$ and $15C_1$ to $15C_4$ which detect the scanning beams, respectively, so as to measure the optical characteristics of each of the scanning beams, wherein images formed by scanning on photosensitive drums 9A, 9B, 9C and 9D serving as members to be scanned shown in FIG. 2 with the plurality of scanning beams, respectively, can be printed on a piece of recording medium (a sheet) in an overlapping manner.

In the present embodiment, each of the optical characteristics measuring devices $15A_1$ to $15A_4$, $15B_1$ to $15B_4$ and $15C_1$ to $15C_4$ is an optical detector which detect an incident timing of each of the optical fluxes.

In the scanning type optical device 1, the optical characteristics measuring devices corresponding to respective scanning beams are classified into three groups, as described above. The optical characteristics measuring devices $15A_1$, $15A_3$, $15A_2$ and $15A_4$ which are the first optical characteristics measuring devices are adapted to detect the optical flux directing toward a predetermined position around one end on a side where a writing operation is started within a scanning region of each of the scanning beams; the optical characteristics measuring devices $15B_1$, $15B_3$, $15B_2$ and $15B_4$ which are the second optical characteristics measuring devices are adapted to detect the optical flux directing toward a predetermined position around the other end within the scanning region of each of the scanning beams; and the optical characteristics measuring devices $15C_1$, $15C_3$, $15C_2$ and $15C_4$ which are the third optical characteristics measuring devices are respectively interposed at substantially the intermediate positions in the scanning direction in the scanning region between the first optical characteristics measuring devices and the second optical characteristics measuring devices.

The scanning type optical device 1 is designed to modulate the laser beams emitted from the four semiconductor lasers 10A, 10B, 10C and 10D respectively, to contents, later described, based on signals detected by above-described three optical characteristics measuring devices per scanning beam.

Although the present embodiment has been explained by way of an example in which one third optical characteristics measuring device is provided with respect to one scanning beam, two or more third optical characteristics measuring devices may be provided with respect to one scanning beam.

In FIG. 1, none of mirrors to be interposed between the scanning lenses 5A, 5B, 5C and 5D and the optical characteristics measuring devices $15A_1$ to $15A_4$, $15B_1$ to $15B_4$ and $15C_1$ to $15C_4$, respectively, are shown (see FIG. 2 with respect to the mirrors).

In the scanning type optical device 1, diverging optical fluxes of the laser beams emitted from the semiconductor lasers 10A, 10B, 10C and 10D, respectively, are coupled by coupling lenses 2A to 2D, respectively, and then, images are focused as linear images in the vicinity of a reflecting point of the polygon mirror 24 by cylindrical lenses 3A to 3D serving as image focusing optical systems, each having power only in a sub-scanning direction. Incidentally, the linear images may be focused at a position slightly apart from the reflecting point.

The optical flux is reflected on the polygon mirror 24, and then, passes through the scanning lens 5A, to be reflected on turning mirrors 6A, 7A and 8A, and thus, is focused on the photosensitive drum 9A via a mirror 16A (which is a half mirror having a property capable of transmitting a part of a beam, although described later) formed of a reflecting member also serving as a dust-proof glass, as shown in FIG. 2.

The optical flux passing through the scanning lens 5B is reflected on turning mirrors 6B, 7B and 8B, and thus, is focused on the photosensitive drum 9B via a mirror 16B also serving as a dust-proof glass in the same manner.

Moreover, the optical flux passing through the scanning lens 5C is reflected on turning mirrors 6C, 7C and 8C, and thus, is focused on the photosensitive drum 9C via a mirror 16C also serving as a dust-proof glass. Additionally, the optical flux passing through the scanning lens 5D is reflected on turning mirrors 6D, 7D and 8D, and thus, is focused on the photosensitive drum 9D via a mirror 16D also serving as a dust-proof glass.

At this time, the surfaces of the photosensitive drums 9A to 9D are electrically charged at a predetermined potential by chargers, not shown, respectively. Consequently, the charged surfaces of the photosensitive drums 9A to 9D are exposed to light, and then, latent images corresponding to colors (cyan, magenta, yellow and black) are formed at the exposed surfaces. Thereafter, the latent images are developed by developing devices, not shown, corresponding to the respective colors, to be thus turned to toner images of respective colors.

The respective toner images formed on the photosensitive drums 9A to 9D are attracted onto a transfer belt 11, and then, sequentially superimposed on and transferred to the recording medium which is transported leftward of FIG. 2.

Although the above-described scanning lenses are disposed one by one for the optical fluxes, a plurality of scanning lenses may be disposed for one optical flux. Furthermore, the scanning lenses 5A and 5C and the scanning lenses 5B and 5D, which are proximate to each other in the vertical direction, as shown in FIG. 2, may be superimposed one on another in the vertical direction, and thus, integrated into one lens.

Although in the scanning type optical device 1 in the present embodiment, two of the scanning beams (the optical fluxes) are assigned to each right and left by the polygon mirrors 24 arranged at two steps in the vertical direction, as shown in FIG. 1, the total number of scanning beams may be further increased or the number of scanning beams to be assigned may be varied.

In the scanning type optical device 1, as shown in FIG. 2, the mirrors 16A, 16B, 16C and 16D formed of the reflecting members are respectively interposed between the turning mirrors 8A, 8B, 8C and 8D in the scanning type optical systems and the photosensitive drums 9A, 9B, 9C and 9D serving as the members to be scanned by the scanning type optical systems with the reflecting surfaces there of inclined at an angle of, for example, about 45° with respect to the scanning beams.

Each of the mirrors 16A, 16B, 16C and 16D consists of a half mirror having a property capable of transmitting a part of the optical flux incident thereinto. The optical characteristics measuring device $15C_1$ detects a part of the optical flux reflected on the mirror 16A; and the optical characteristics measuring device $15C_2$ detects a part of the optical flux reflected on the mirror 16B.

The optical characteristics measuring device $15C_3$ detects a part of the optical flux reflected on the mirror 16C; and the optical characteristics measuring device $15C_4$ detects a part of the optical flux reflected on the mirror 16D.

The optical fluxes transmitting through the mirrors 16A, 16B, 16C and 16D reach the photosensitive drums 9A, 9B, 9C and 9D, respectively. Moreover, the optical characteristics measuring devices $15A_1$ and $15B_1$, $15A_2$ and $15B_2$, $15A_3$ and $15B_3$ and $15A_4$ and $15B_4$ positioned on both sides in the main scanning direction are fixed to a fixing unit in the optical device 1 out of a writing region on both sides in the main scanning direction.

The optical fluxes reflected on the mirrors 16A, 16B, 16C and 16D are incident into the optical characteristics measuring devices $15A_1$, $15B_1$, $15A_2$, $15B_2$, $15A_3$, $15B_3$, $15A_4$ and $15B_4$, wherein since the mirrors which guide the optical fluxes to the optical characteristics measuring devices $15A_1$, $15B_1$, $15A_2$, $15B_2$, $15A_3$, $15B_3$, $15A_4$ and $15B_4$ are located out of the writing region, it is preferable that the portion should be formed of not the half mirror but a mirror of a full reflection type.

An optical detector capable of detecting the incident timing of the optical flux such as a PD is used as each of the optical characteristics measuring devices $15A_1$, $15B_1$, $15C_1$, $15A_2$, $15B_2$, $15C_2$, $15A_3$, $15B_3$, $15C_3$, $15A_4$, $15B_4$ and $15C_4$.

Otherwise, a beam diameter measuring device or a light intensity measuring device may be used as each of the optical characteristics measuring devices. In the instance where a beam diameter measuring device is used as each of the optical characteristics measuring devices, correction is performed by adjusting the position of the cylindrical lens according to the measurement result of a beam diameter measured by each of the beam diameter measuring devices.

In contrast, in the instance where a light intensity measuring device is used as each of the optical characteristics measuring devices, correction is performed by adjusting power (i.e., LD power) of the semiconductor laser according to the light intensity measurement result of the optical flux measured by each of the light intensity measuring devices.

In this manner, since the correction can be performed with the optical characteristics measuring devices $15A_1$, $15B_1$, $15C_1$, $15A_2$, $15B_2$, $15C_2$, $15A_3$, $15B_3$, $15C_3$, $15A_4$, $15B_4$ and $15C_4$ using any one of the optical detector, the beam diameter measuring device and the light intensity measuring device, a high-quality color image excellent in hue (tint) with little color drifting can be formed even if an image to be formed is a full color image.

Next, the correction of a start time of a writing operation which is performed by an image formation apparatus having the scanning type optical device 1 will be explained.

Assuming that the number of pixels by one scanning on the design is N, the number N of pixels by one scanning is expressed by the following equation $$N = f_0 \times T_1$$

where $f_0$ designates a writing frequency and $T_1$ denotes an ideal time after the detection of the optical flux detected by each of the optical characteristics measuring devices $15A_1$, $15A_3$, $15A_2$ and $15A_4$ which detect the optical flux directing toward a predetermined position around a scanning start position till the detection of the optical flux detected by each of the optical characteristics measuring devices $15B_1$, $15B_3$, $15B_2$ and $15B_4$ which detect the optical flux directing toward a predetermined position around a scanning end position.

Since an error is generated with respect to a design value in the lens constituting the scanning type optical system caused by variations in fabrication, environmental temperatures, and further, fixing errors or the like, a real time $T_1'$ is different from the ideal time $T_1$ assuming that $T_1'$ denotes the real time after the detection of the optical flux detected by each of the optical characteristics measuring devices $15A_1$, $15A_3$, $15A_2$ and $15A_4$ which detect the optical flux directing toward the predetermined position around the scanning start position till the detection of the optical flux detected by each of the optical characteristics measuring devices $15B_1$, $15B_3$, $15B_2$ and $15B_4$ which detect the optical flux directing toward the predetermined position around the scanning end position.

Therefore, the number N of pixels has the relationship expressed by the following equation, $$N \neq f_0 \times T_1'$$

where the image formed as the result turns out to be stretched or shrunk.

Thus, when a correction writing frequency $f_1 = f_0 \times T_1'/T_1$ obtained by correcting the writing frequency $f_0$ is used in place of the writing frequency $f_0$, the relationship equation below is established with respect to the number N of pixels by one scanning on the design $$N = f_1 \times T_1'$$

Furthermore, the optical characteristics measuring devices $15C_1$, $15C_2$, $15C_3$ and $15C_4$ which are the third optical characteristics measuring devices are located at substantially the intermediate positions in the scanning direction in the scanning region in the scanning type optical device 1 in the present embodiment, as described above.

Assuming that $T_2$ and $T_2'$ designate an ideal time and a real time, respectively, after the detection of the optical flux detected by each of the optical characteristics measuring devices $15A_1$, $15A_3$, $15A_2$ and $15A_4$ which detect the optical flux directing toward the predetermined position around the scanning start position till the detection of the optical flux detected by each of the optical characteristics measuring devices $15C_1$, $15C_3$, $15C_2$ and $15C_4$ which detect the optical flux directing toward substantially the intermediate positions in the scanning direction in the scanning region, and $t_1$ designates an ideal time (a time on the design) after the detection of the optical flux detected by each of the optical characteristics measuring devices $15A_1$, $15A_3$, $15A_2$ and $15A_4$ till starting to write in an image forming region (a plotting region) with the optical flux, time $t_2$ which is a time after the detection of the optical flux directing toward the predetermined position around the scanning start position by each of the optical characteristics measuring devices $15A_1$, $15A_3$, $15A_2$ and $15A_4$ till starting to write in the image forming region with the optical flux in the scanning type optical device 1 is obtained based on the following equation.

$$t_2 = t_1 \times T_1/T_1' - (T_2' - T_2)/2$$

Here, $T_1/T_1'$ designates a correction value for correcting a variation in scanning speed of the scanning beam caused by deformation of the lens constituting the scanning type optical system during the ideal time $t_1$ due to the variation in fabrication or change in environmental temperature, as described above.

With the above-described correction, the difference between the ideal time and the real time can be remarkably reduced in comparison with the conventional scanning type optical device in which the optical characteristics measuring devices are disposed at both ends in the scanning region, and the writing start time is corrected based on the time after the detection of the optical flux by each of the optical characteristics measuring devices at one end till the detection of the optical flux by each of the optical characteristics measuring devices at the other end.

This will be explained below in reference to FIG. 3. The optical characteristics measuring devices are disposed at both ends in the scanning region in the prior art, and it is assumed that $T_1$ and $T_1'$ designate the ideal time and the real time, respectively, after the detection of the optical flux by each of the optical characteristics measuring devices at one end till the detection of the optical flux by each of the optical characteristics measuring devices at the other end and $f_0$ denotes the basic writing frequency. If the ideal value before the correction has a deviation, as indicated by a solid line in FIG. 3, in the instance with the method where the correction writing frequency $f_1$ is $f_1 = f_0 \times T_1'/T_1$, a deviation of the real image height from the ideal image height is set to 0 (i.e., Δ=0) by correcting both ends in the main scanning direction in the scanning region, as indicated by a broken line in FIG. 3, so that the maximum deviation becomes A at substantially the intermediate portion in the main scanning direction.

In contrast, in the image formation apparatus in the embodiment described above in reference to FIG. 2, the time $t_2$ after the detection of the optical flux directing toward the predetermined position around the scanning start position by each of the optical characteristics measuring devices $15A_1$, $15A_3$, $15A_2$ and $15A_4$ till starting to write in the image forming region with the optical flux is set to a time obtained by the above-described equation, as follows $$t_2 = t_1 \times T_1/T_1' - (T_2' - T_2)/2.$$

That is to say, it is the time in which the ideal time (the time on the design) $t_1$ after the detection of the optical flux detected by each of the optical characteristics measuring devices $15A_1$, $15A_3$, $15A_2$ and $15A_4$ till the writing start in the image forming region (the plotting region) with the optical flux is multiplied by the correction value $T_1/T_1'$ for correcting the variation in scanning speed which is varied caused by the deformation or the like of the lens constituting the scanning type optical system; and then, a value obtained by bisecting a value obtained by subtracting the ideal time $T_2$ from the real time $T_2'$ after the detection of the optical flux detected by each of the optical characteristics measuring devices $15A_1$, $15A_3$, $15A_2$ and $15A_4$ till the detection of the optical flux detected by each of the optical characteristics measuring devices $15C_1$, $15C_3$, $15C_2$ and $15C_4$ is subtracted from the multiplied result.

Figure 3:
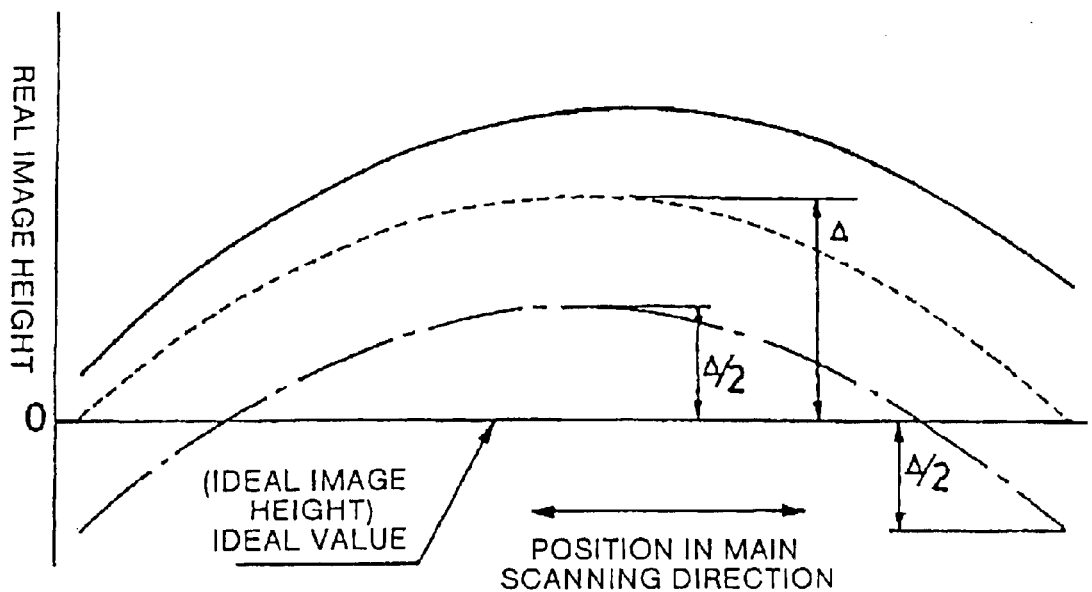
FIG. 3 is a graph which shows a deviation of a real image height from an ideal image height before and after correction.

In this manner, the maximum deviation of the real image height from the ideal image height can be set to Δ/2 at both ends and substantially the intermediate portion in the main scanning direction in the scanning region, as indicated by a dashed line in FIG. 3. Consequently, the maximum deviation can be halved with respect to the maximum deviation a in the characteristics curve indicated by the broken line in FIG. 3 in the instance where the optical characteristics measuring devices are disposed only around both ends in the scanning region in the prior art.

Thus, according to the image formation apparatus provided with the scanning type optical device 1, it is possible to prevent, over the entire scanning region, any generation of a portion at which the difference between the real image height and the ideal image height is extremely large, so that little color drifting occurs on the image even when a full-color image is formed. Furthermore, the hue (the tint) becomes excellent.

The mirrors 16A, 16B, 16C and 16D are located on the optical paths of the scanning beams directing toward the photosensitive drums 9A, 9B, 9C and 9D from the turning mirrors 8A, 8B, 8C and 8D in the scanning type optical systems, respectively, in the scanning type optical device 1 provided in the image formation apparatus, as shown in FIG. 2. However, since each of the mirrors is a half mirror having the property capable of transmitting a part of the incident optical flux, it is unnecessary to allow the mirrors to retreat from the optical paths of the scanning beams even during the image formation.

As a result, no need of moving mechanisms for moving the mirrors 16A, 16B, 16C and 16D can simplify the configuration.

Each of the mirrors 16A, 16B, 16C and 16D constituted of the half mirror is covered at an optical flux reflecting side thereof (an upper side surface in FIG. 2) with a reflection preventing film.

Therefore, the optical flux incident into each of the mirrors 16A, 16B, 16C and 16D can be certainly divided into the beam on a reflection side and the beam on a transmission side, and noise intruding into the optical characteristics measuring devices $15A_1$ to $15A_4$, $15B_1$ to $15B_4$ and $15C_1$ to $15C_4$ can be prevented on the surface covered with the reflection preventing film on the opposite side. Additionally, the light intensity of the optical flux directing toward each of the photosensitive drums 9A, 9B, 9C and 9D for the purpose of the image formation is increased, thereby suppressing the power of the semiconductor laser, so as to save the consumption of electric power.

Figure 4:
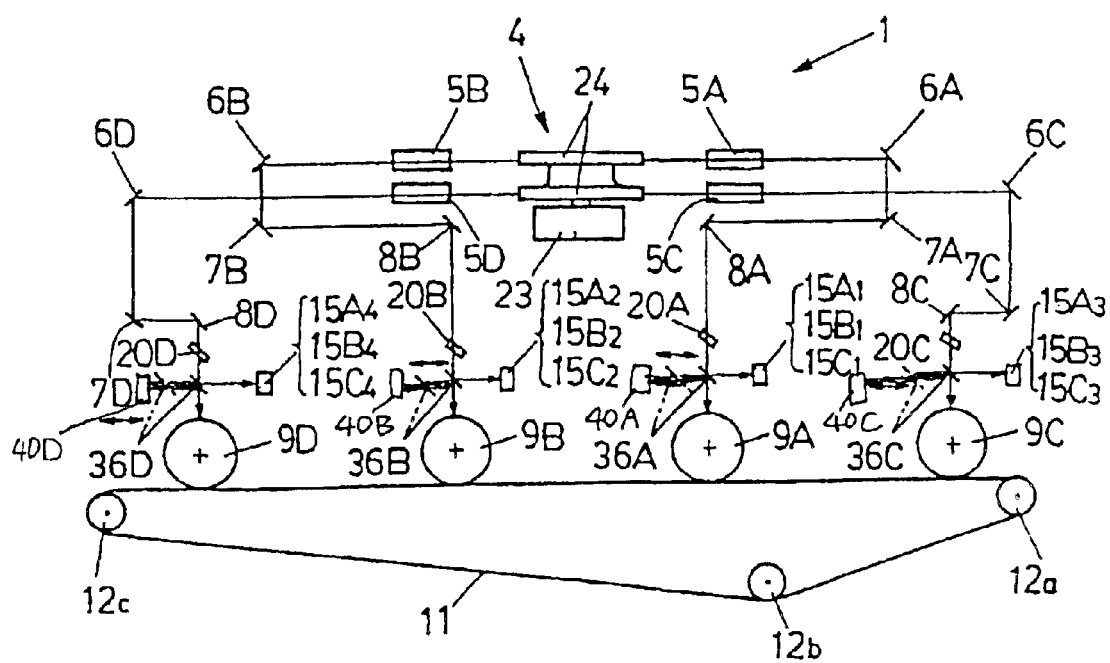
FIG. 4 is a view which shows the configuration of an image formation apparatus provided with a scanning type optical device in a second embodiment according to the present invention, similarly to FIG. 2.

FIG. 4 is a view which shows the configuration of an image formation apparatus provided with a scanning type optical device in a second embodiment according to the present invention, similarly to FIG. 2. The same constituent elements as those in FIG. 2 are designated by the same reference numerals.

The image formation apparatus in the present embodiment is different from the embodiment described in reference to FIGS. 1 and 2 in that mirrors 36A, 36B, 36C and 36D serving as reflecting members which guide scanning beams (optical fluxes) corresponding to respective colors to third optical characteristics measuring devices $15C_1$, $15C_2$, $15C_3$ and $15C_4$, respectively, are disposed independently of special dust-proof glasses 20A, 20B, 20C and 20D, respectively; the mirrors 36A, 36B, 36C and 36D are of a full reflection type; and there are provided reflecting member moving devices, not shown, which move the mirrors 36A, 36B, 36C and 36D to retreating positions indicated by phantom lines in FIG. 4 (for example, linearly moving mechanisms by using solenoids) in order to prevent the optical fluxes directing toward photosensitive drums 9A to 9D during image formation from being shut out by the mirrors respectively.

In the present embodiment, since the mirrors 36A, 36B, 36C and 36D are of a full reflection type, light beams incident into the mirrors never transmit in the incident direction. Therefore, the scanning beams directing toward the photosensitive drums 9A to 9D, respectively, are shut out by the mirrors 36A, 36B, 36C and 36D if the mirrors are located at positions indicated by solid lines in FIG. 4 during the image formation (during image plotting), so as not to reach the photosensitive drums 9A to 9D.

In view of this, in the present embodiment, the above-described moving devices (a single moving device may be configured to move the four mirrors in association) are driven during a period of time after optical characteristics measurement till the image formation (plotting), thereby moving the mirrors 36A, 36B, 36C and 36D to the retreating positions indicated by phantom lines in FIG. 4, respectively.

Although the mirrors 36A, 36B, 36C and 36D are provided in a one-to-one correspondence for four scanning beams directing toward the four photosensitive drums 9A to 9D for the sake of a simple explanation in FIG. 4, the mirrors 36A, 36B, 36C and 36D are actually provided in a three-to-one correspondence for the scanning beams. Out of the mirrors, only the mirrors located substantially at the center in the scanning region in a manner corresponding to the optical characteristics measuring devices $15C_1$, $15C_2$, $15C_3$ and $15C_4$ are moved to the retreating positions indicated by the phantom lines in FIG. 4 by the moving devices.

Upon completion of the image formation, the mirrors 36A, 36B, 36C and 36D located substantially at the center in the scanning region are returned to the positions indicated by the solid lines in FIG. 4 at a predetermined timing.

Also in the present embodiment, a writing start timing of each of the optical fluxes is corrected in the same manner as in the embodiment described in reference to FIGS. 1 to 3.

Here, a device which detects the position of the incident optical flux such as a two-dimensional CCD may be used as the optical characteristics measuring device in the above-described embodiment.

In this instance, the optical flux from a light source is guided in the vicinity of the center of each of the two-dimensional CCDs. And then, a deviation in a main scanning direction of the optical flux is measured based on a difference between an actual optical flux detecting position and an ideal position.

The writing start timing of each of the optical fluxes is corrected by correcting a writing frequency in such a manner as to prevent any deviation by the optical characteristics measuring devices $15A_1$, $15A_2$, $15A_3$ and $15A_4$ consisting of the two-dimensional CCDs which detect the optical fluxes directing toward predetermined positions around scanning start positions and the optical characteristics measuring devices $15B_1$, $15B_3$, $15B_2$ and $15B_4$ consisting of the two-dimensional CCDs which detect the optical fluxes directing toward predetermined positions around scanning end positions.

Subsequently, the writing start timing is corrected in such a manner as to halve a deviation (a deviation of a real image height from an ideal image height, as described in reference to FIG. 3) of each of the optical characteristics measuring devices $15B_1$, $15B_2$, $15B_3$ and $15B_4$ consisting of the two-dimensional CCDs which detect the optical fluxes directing toward the vicinity of the center in the scanning region with the writing frequency fixed, there by suppressing the deviation in the main scanning direction to a low level across the entire writing width (see the phantom lines, which indicate the deviations, in FIG. 3).

Figure 5:
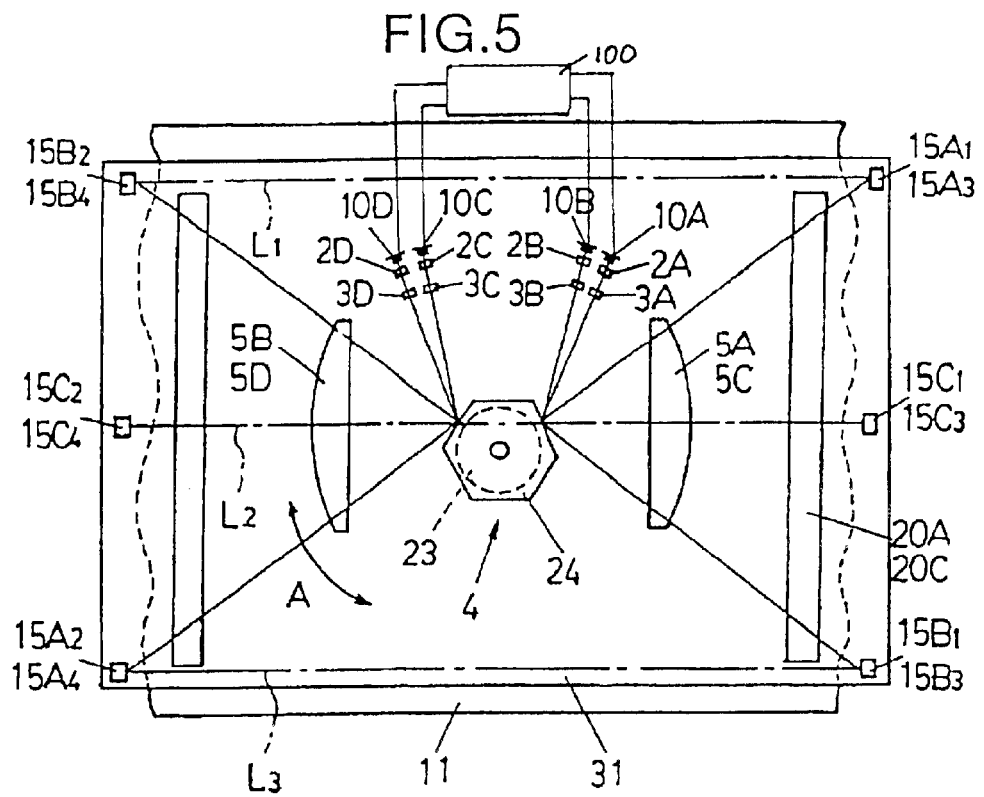
FIG. 5 is a view which shows a scanning type optical device in a third embodiment according to the present invention, similarly to FIG. 1.

FIG. 5 is a view which shows a scanning type optical device in a third embodiment according to the present invention, similarly to FIG. 1. The same constituent elements as those in FIG. 1 are designated by the same reference numerals.

In a scanning type optical device in the present embodiment, all of first optical characteristics measuring devices $15A_1$, $15A_2$, $15A_3$ and $15A_4$, second optical characteristics measuring devices $15B_1$, $15B_2$, $15B_3$ and $15B_4$ and third optical characteristics measuring devices $15C_1$, $15C_2$, $15C_3$ and $15C_4$ are fixed to the same fixing member 31, which is supported in a manner movable in a direction indicated by an arrow A, i.e., in a rotating direction of polygon mirrors 24.

Therefore when a transfer belt 11 is stretched slantwise toward the direction indicated by the arrow A in FIG. 5, color drifting is generated if the transfer belt 11 is inclined with respect to a scanning type optical system. However, in the present embodiment, even in such an instance, a fixing member 31 is moved to be inclined in the direction indicated by the arrow A according to the inclination of the transfer belt 11, thus preventing any color drifting as described above.

In this scanning type optical device, the optical characteristics measuring devices $15A_1$, $15B_2$, $15A_3$ and $15B_4$, the optical characteristics measuring devices $15B_1$, $15A_2$, $15B_3$ and $15A_4$ and the optical characteristics measuring devices $15C_1$, $15C_2$, $15C_3$ and $15C_4$, the respective groups of which are perpendicular to each other in a main scanning direction and face to each other along an optical flux emitting direction, out of the first optical characteristics measuring devices $15A_1$, $15A_2$, $15A_3$ and $15A_4$, the second optical characteristics measuring devices $15B_1$, $15B_2$, $15B_3$ and $15B_4$ and the third optical characteristics measuring devices $15C_1$, $15C_2$, $15C_3$ and $15C_4$ corresponding to a plurality of photosensitive. drums, respectively, are aligned on straight lines $L_1$, $L_2$ and $L_3$ drawn along the optical flux emitting direction in a perpendicular manner in the main scanning direction. Here, the straight lines $L_1$, $L_2$ and $L_3$ are drawn substantially in parallel to each other.

In this manner, the optical characteristics measuring devices in the scanning type optical systems corresponding to the same main scanning position are aligned on the same straight line. Moreover, the transfer belt 11 is stretched across and turned by rollers 12a, 12b and 12c, as shown in FIG. 2, to be thus prevented from meandering, thereby readily adjusting the optical characteristics measuring devices.

Incidentally, each of the optical characteristics measuring devices in the above-described embodiment may be a device which detects the position of the optical flux incident thereinto such as an area sensor.

In the instance of the use of area sensors, modulation is performed such that a light source emits a light beam in such a manner as to shoot the optical flux in the vicinity of the vicinity of the center of each of the area sensors in an ideal state, and then, a deviation of a writing position in the main scanning direction is determined based on a deviation of a light beam detecting position detected by each of the area sensors from an ideal position.

Both of the four color-ready color image formation apparatuses shown in FIGS. 2 and 4 are of a type in which the recording medium is placed on the transfer belt 11, and respective toner images of colors are sequentially transferred directly on the recording medium.

Figure 6:
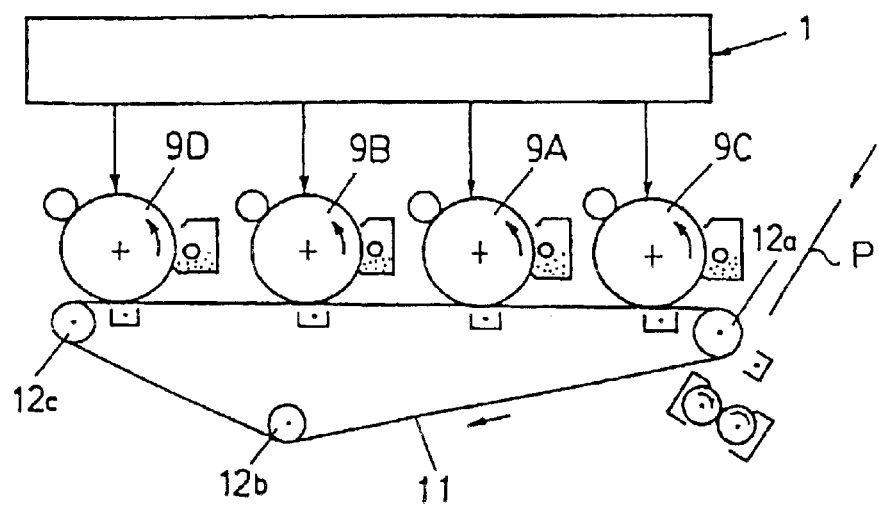
FIG. 6 is a view which shows the configuration of an image formation unit in an image formation apparatus of a type in which four colors imposed toner images, in which each color is superimposed one on another on a transfer belt, are transferred onto a recording medium at one time.

In contrast, the present invention is applicable also to an apparatus of a type in which respective toner images of colors are temporarily transferred in such a manner as to be superimposed in sequence at accurate positions of a transfer belt (an intermediate transfer belt) 11, as shown in FIG. 6, (in which the same constituent elements as those in FIGS. 2 and 4 are designated by the same reference numerals) and then, the toner images of four colors in superimposition are transferred onto a recording medium P at one time.

The process until the toner images are formed on photosensitive drums 9A to 9D, respectively, is identical to that in the image formation apparatus described in reference to FIG. 2.

The effects achieved with the present invention are as follows.

In the scanning type optical device and the image formation apparatus according to the present invention, there are provided a first optical characteristics measuring unit which detects optical fluxes directing toward predetermined positions around one end within a scanning region of each of scanning beams; a second optical characteristics measuring unit which detects the optical fluxes directing toward predetermined positions around the other end within the scanning region of each of the scanning beams; and a third optical characteristics measuring unit interposed between the first optical characteristics measuring unit and the second optical characteristics measuring unit, so that the optical fluxes emitted from the light sources are modulated based on signals detected by the three optical characteristics measuring units. Consequently, a difference in height between a real image and an ideal image can be corrected to be reduced also at the center portion in the scanning region, thereby preventing any generation of a portion at which the difference in height between the real image and the ideal image over the entire scanning region is extremely large, and further, making it difficult to generate color drifting on the image even when the color image is formed and making the hue (tint) excellent.

Moreover, since a reflecting member which guides the optical flux to the third optical characteristics measuring unit is formed of a half mirror, it is unnecessary to allow the half mirror to retreat from the optical path of the scanning beam even during the image formation, thereby simplifying the configuration because unit which moves the reflecting member becomes unnecessary. Furthermore, it is possible to suppress an increase in cost and avoid an increase in size of the device.

Furthermore, reflecting members are interposed with reflecting surfaces thereof inclined with respect to the scanning beams, between the scanning type optical systems corresponding to the third optical characteristics measuring unit and members to be scanned by the scanning type optical systems. Consequently, the reflecting member can be moved to the retreat position by the reflecting member moving unit during the image formation even if the reflecting member is located within the scanning region, thereby preventing the scanning beam for use in the image formation from being shut out, so as to make it difficult to generate color drifting and form the image excellent in hue.

Moreover, each of the first, second and third optical characteristics measuring unit is an optical detecting unit which detects an incident timing of the optical flux, thereby measuring the optical characteristics of the scanning beam with high accuracy, and modulating the optical flux emitted from the light source based on the measurement result. Consequently, it is possible to prevent any color drifting on the color image and achieve the excellent hue (tint).

Furthermore, the half mirror, which is used as the reflecting member, is coated with a reflection preventing film at a surface except for a surface on which the optical flux is reflected, thereby preventing any noise which intrudes into the optical characteristics measuring unit from the surface on the side of the reflection preventing film. In this way, the light intensity of the optical flux directing toward the member to be scanned for the image formation can be increased, thereby suppressing semiconductor laser power, resulting in reduction of power consumption.

Moreover, all of the first, second and third optical characteristics measuring units are fixed to the same fixing member, which is movably supported in a rotating direction of the rotating member of the deflector. Consequently, even when the transportation system for transporting the recording medium is fixed slantwise with respect to the rotating direction of the rotary member in the deflector, it is possible to prevent any color drifting on the color image by moving and inclining the fixing member with respect to the rotating direction according to the inclination of the transportation system.

Furthermore, the optical characteristics measuring units in the scanning type optical system corresponding to the same main scanning position are aligned on the same straight line, thereby readily adjusting each of the optical characteristics measuring unit.

Moreover, the optical characteristics measuring unit is a unit which detects the incident timing of the incident optical flux, and according to the ninth aspect, the optical characteristics measuring unit is a unit which detects the position of the incident optical flux.

Consequently, the optical characteristics of the scanning beam can be measured with high accuracy, and further, the optical flux emitted from the light source can be modulated based on the measurement result. Thus, it is possible to prevent any color drifting on the color image and achieve the excellent hue (tint).

The present document incorporates by reference the entire contents of Japanese priority document, 2001-191066 filed in Japan on Jun. 25, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A scanning type optical device comprising:
    a light source which emits an optical flux;
    a deflector which deflects, with a rotating member, the optical flux from a first position to a second position;
    an optical system which guides the optical flux deflected to a scanning region from a third position corresponding to the first position to a fourth position corresponding to the second position;
    a first optical characteristics measuring unit which detects the optical flux guided around the third position;
    a second optical characteristics measuring unit which detects the optical flux guided around the fourth position;
    a third optical characteristics measuring unit which detects an optical flux guided to a predetermined position between the third position and the fourth position; and
    a modulating unit which modulates the optical flux emitted from the light source based on signals detected by the first, second, and third optical characteristics measuring units; and
    a half mirror which transmits one part of the optical flux to the scanning region and reflects another part of the optical flux into the third optical characteristics measuring unit.

2. The scanning type optical device according to claim 1, wherein each of the first, second and third optical characteristics measuring unit is an optical detecting unit which detects an incident timing of the optical flux.

3. The scanning type optical device according to claim 1, wherein the half mirror is coated with a reflection preventing film at a surface except for a side on which the optical flux is reflected.

4. The scanning type optical device according to claim 1, further comprising a fixing member which fixes all of the first, second and third optical characteristics measuring units and is movably supported in a rotating direction of the rotating member of the deflector.

5. The scanning type optical device according to claim 1, wherein the first, second, and third optical characteristics measuring units detect a timing that the optical flux is incident on the respective optical characteristics measuring units.

6. The scanning type optical device according to claim 1, wherein the first, second, and third optical characteristics measuring units detect a position that the optical flux is incident on the respective optical characteristics measuring units.

7. A scanning type optical device comprising:
    a light source which emits an optical flux;
    a deflector which deflects, with a rotating member, the optical flux from a first position to a second position;
    an optical system which guides the optical flux deflected to a scanning region from a third position corresponding to the first position to a fourth position corresponding to the second position;
    a first optical characteristics measuring unit which detects the optical flux guided around the third position;
    a second optical characteristics measuring unit which detects the optical flux guided around the fourth position;
    a third optical characteristics measuring unit which detects an optical flux guided to a predetermined position between the third and the fourth position; position and
    a modulating unit which modulates the optical flux emitted from the light source based on signals detected by the first, second, and third optical characteristics measuring units;
    a reflecting member which is located at a first reflecting position which shuts out a part of the optical flux guided and reflects the other part of the optical flux into the third optical characteristics measuring unit; and
    a reflecting member moving unit which moves the reflecting member to a second reflecting position which prevents the reflecting member from shutting out the optical flux directed toward the scanning region.

8. The scanning type optical device according to claim 7, wherein each of the first, second and third optical characteristics measuring unit is an optical detecting unit which detects an incident timing of the optical flux.

9. The scanning type optical device according to claim 7, further comprising a fixing member which fixes all of the first, second and third optical characteristics measuring units and is movably supported in a rotating direction of the rotating member of the deflector.

10. The scanning type optical device according to claim 7, wherein the first, second and and third optical characteristics measuring units detect a timing that that optical flux is incident on the respective optical characteristics measuring units.

11. The scanning type optical device according to claim 7, wherein the first, second and third optical characteristics measuring units detect a position that the optical flux is incident on the respective optical characteristics measuring units.

12. An image formation apparatus comprising a scanning type optical device that includes:
    a light source which emits an optical flux;
    a deflector which deflects, with a rotating member, the optical flux from a first position to a second position;

an optical system which guides the optical flux deflected to a scanning region from a third position corresponding to the first position to a fourth position corresponding to the second position;

a first optical characteristics measuring unit which detects the optical flux guided around the third position;

a second optical characteristics measuring unit which detects the optical flux guided around the fourth position;

a third optical characteristics measuring unit which detects an optical flux guided to a predetermined position between the third position and the fourth position; and a modulating unit which modulates the optical flux emitted from the light source based on signals detected by the first, second and third optical characteristics measuring units; and a half mirror which transmits one part of the optical flux to the scanning region and reflects the other part of the optical flux into the third optical characteristics measuring unit.

13. An image formation apparatus comprising a scanning type optical device that includes:

a light source which emits an optical flux;

a deflector which deflects, with a rotating member, the optical flux from a first position to a second position;

an optical system which guides the optical flux deflected to a scanning region from a third position corresponding to the first position to a fourth position corresponding to the second position;

a first optical characteristics measuring unit which detects the optical flux guided around the third position;

a second optical characteristics measuring unit which detects the optical flux guided around the fourth position;

a third optical characteristics measuring unit which detects an optical flux guided to a predetermined position between the third position and the fourth position; and a modulating unit which modulates the optical flux emitted from the light source based on signals detected by the first, second and third optical characteristics measuring units;

a reflecting member which is located at a first reflecting position which shuts out a part of the optical flux guided and reflects the other part of the optical flux into the third optical characteristics measuring unit; and a reflecting member moving unit which moves the reflecting member to a second reflecting position which prevents the reflecting member from shutting out the optical flux directed the scanning region.

* * * * *